United States Patent
Hangmann et al.

(10) Patent No.: US 9,464,814 B2
(45) Date of Patent: Oct. 11, 2016

(54) CLEANING DEVICE FOR KITCHEN APPLIANCES AND PUMP SYSTEMS

(71) Applicant: HANNING ELEKTRO-WERKE GMBH & CO. KG, Oerlinghausen (DE)

(72) Inventors: Werner Hangmann, Schloss Holte-Stukenbrock (DE); Thomas Pflug, Bielefeld (DE); Christian Evert, Paderborn (DE)

(73) Assignee: HANNING ELEKTRO-WERKE GmbH & Co. KG, Oerlinghausen (DE)

( * ) Notice: Subject to any disclaimer, the term of this patent is extended or adjusted under 35 U.S.C. 154(b) by 310 days.

(21) Appl. No.: 14/219,712

(22) Filed: Mar. 19, 2014

(65) Prior Publication Data
US 2015/0090304 A1    Apr. 2, 2015

(30) Foreign Application Priority Data

Mar. 19, 2013 (DE) .......................... 10 2013 004 660
Oct. 2, 2013 (DE) .......................... 10 2013 110 974

(51) Int. Cl.
*A21B 3/00*    (2006.01)
*A47L 15/00*    (2006.01)
(Continued)

(52) U.S. Cl.
CPC ............. *F24C 14/005* (2013.01); *A21B 3/006* (2013.01); *A47L 15/0097* (2013.01); *F04B 23/02* (2013.01); *F04B 23/04* (2013.01); *F04B 41/06* (2013.01); *B08B 9/00* (2013.01)

(58) Field of Classification Search
CPC ..... A21B 3/006; A47L 15/0097; B08B 9/00; F04B 23/02; F04B 23/04; F04B 41/06; F24C 14/005
USPC .............................................. 134/22.1, 104.2
See application file for complete search history.

(56) References Cited

U.S. PATENT DOCUMENTS

2005/0109376 A1* 5/2005 Gregory ................ B08B 9/0936
134/22.1
2006/0260476 A1* 11/2006 Helm .................... F24C 14/005
99/476

(Continued)

FOREIGN PATENT DOCUMENTS

DE    102006025508 A1    12/2006
EP    1717518 A1    4/2005

(Continued)

OTHER PUBLICATIONS

European Partial Search Report in corresponding European Application No. EP 14160237.5, dated Oct. 26, 2015.

(Continued)

*Primary Examiner* — Michael Barr
*Assistant Examiner* — Levon J Shahinian
(74) *Attorney, Agent, or Firm* — Patent Central LLC; Stephan A. Pendorf

(57) ABSTRACT

Cleaning apparatus for kitchen equipment, in particular combination streaming, baking and cooking equipment has a cooking space that is to be cleaned which is delimited by at least one wall and includes at least one outlet opening for a liquid. The apparatus comprises a ventilation fan associated with the cooking space having a drive motor; a collecting tank which at least temporarily collects the liquid that exits the cooking space via the outlet opening; a supply line that can be used to supply fresh water and/or a cleaning fluid that can be controlled through a valve in the line; a circulating pump provided at the collecting tank for the liquid sitting in the collecting tank; a circulation line by which the liquid sitting in the collecting tank and conveyed by the circulating pump can be supplied to the cooking space and a drain line for discharging the liquid that exits the cooking space. A drain pump is provided at the circulation container in addition to the circulating pump which is able to actively convey the liquid sitting in the collecting tank, together with solids that may be present therein, into the drain line.

12 Claims, 5 Drawing Sheets

(51) Int. Cl.
  *B08B 9/00* (2006.01)
  *F04B 23/02* (2006.01)
  *F04B 23/04* (2006.01)
  *F04B 41/06* (2006.01)
  *F24C 14/00* (2006.01)

(56) References Cited

U.S. PATENT DOCUMENTS

2007/0157920 A1   7/2007   De Miranda Grieco
2009/0178576 A1   7/2009   Valentine et al.

FOREIGN PATENT DOCUMENTS

EP   1862104 A1   12/2007
WO   2009091635 A2   7/2009

OTHER PUBLICATIONS

German Examination Report Corresponding to German Application No. DE 10 2013 110 974.8, Dated Apr. 27, 2015.
European Search Report dated Mar. 11, 2016, in European Application No. 14160237.

* cited by examiner

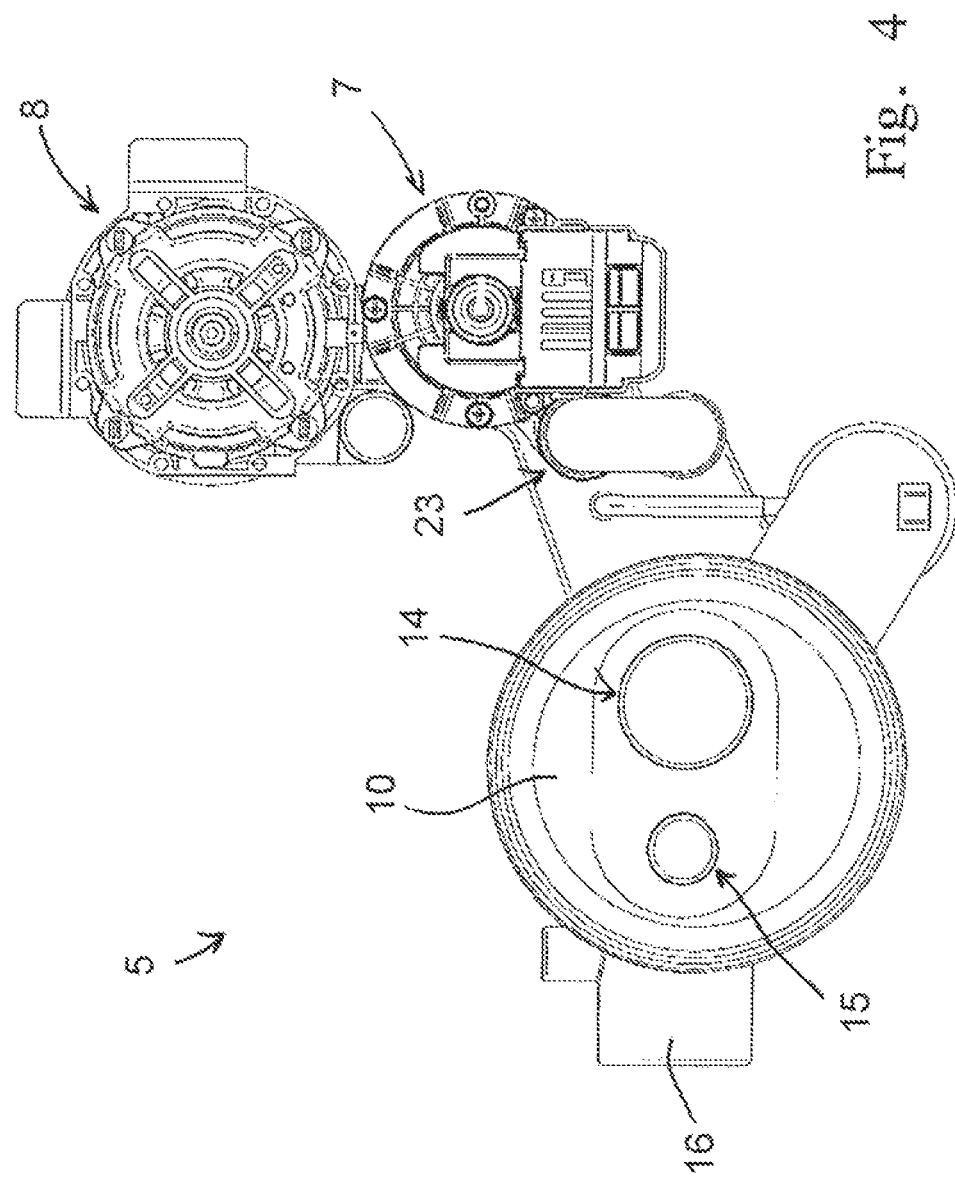

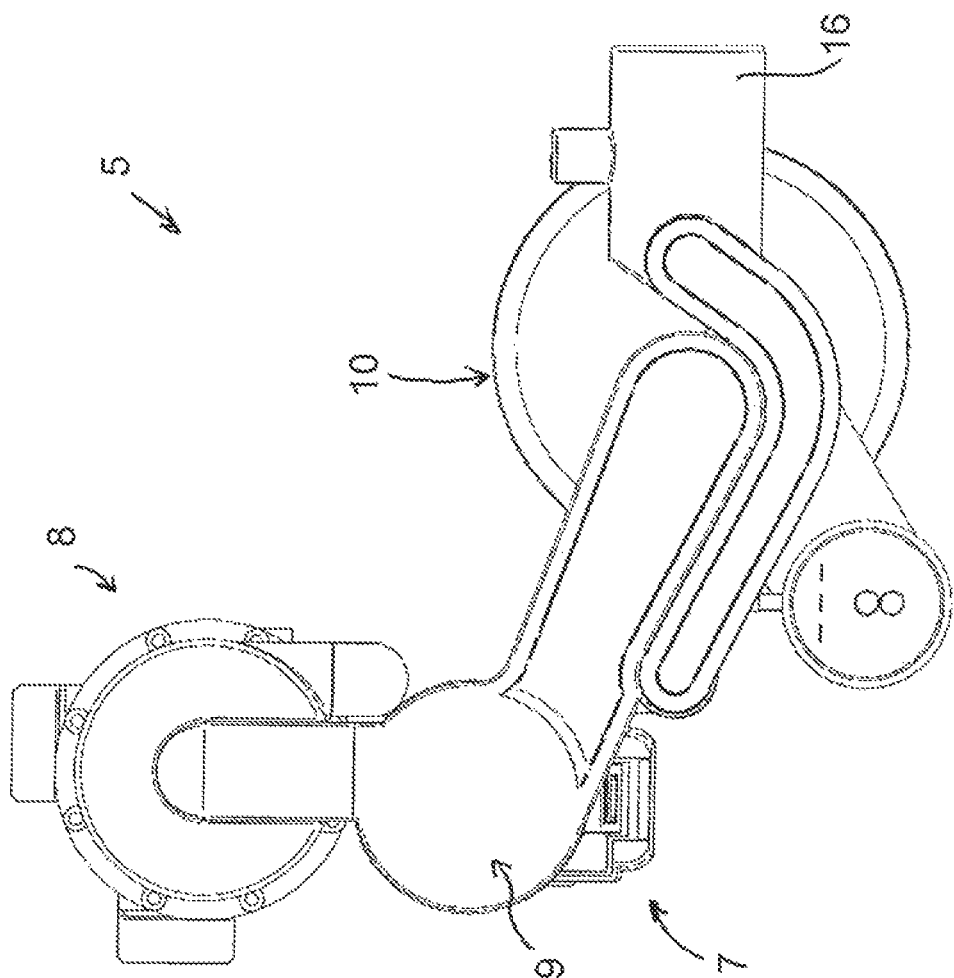

CLEANING DEVICE FOR KITCHEN APPLIANCES AND PUMP SYSTEMS

BACKGROUND OF THE INVENTION

The invention relates to a cleaning apparatus for kitchen equipment, in particular combination steamer, baking and/or cooking equipment having a cooking space to be cleaned that is delimited by at least one wall. The cooking space has at least one outlet opening for a liquid, a ventilation fan with a drive motor, and a collecting tank which at least temporarily collects the liquid that exits the cooking space via the outlet opening. A supply line is provided to supply fresh water and/or cleaning fluid, under control of a valve, to the cooking space. A circulating pump is provided for the liquid collected in the collecting tank with a circulation line by which the liquid, sitting in the collecting tank, can be conveyed to the cooking space. The apparatus also has a drain line for discharging the liquid that exits the cooking space.

Furthermore, the invention relates to a pump system that can be used, in particular, for a cleaning apparatus according to the invention.

DE 10 2013 004 660.2 describes such a pump system. The entire contents of DE 10 2013 004 660.2 are incorporated by reference herein and are to be considered and become part of the present disclosure.

Cleaning apparatuses for kitchen equipment, in particular for combination steamer, baking and/or cooking equipment regularly uses a circulating pump in order to supply a cleaning fluid to the cooking space of the kitchen equipment that is to be cleaned. The liquid is regularly provided in a collecting tank arranged underneath the cooking space and into which the liquid that is present in the cooking space can flow by passing through an outlet opening.

A circulating pump is provided at the collecting tank. It is typically associated with the area of a lower part of the collecting tank, the so-called "collection pot".

In addition to the cleaning fluid, the liquids obtained during food preparation and solids resulting from cleaning, such as condensed out lime or excess water resulting from steaming a substance to be cooked, as well as cooking residues and grease are collected in the collecting tank. To empty the collecting tank, it is conventional to provide a drain line that has a controllable valve. The collecting tank can then be emptied as needed via valve actuation. Due to aggressive media that arise in the preparation of the items to be cooked and during cleaning of the cooking equipment, the valve must be made of a highly resistant material, such as stainless steel. For this reason the valve is very expensive.

SUMMARY OF THE INVENTION

The principal objective of the present invention is to improve a cleaning apparatus for kitchen equipment in such a way that removes the requirement for a valve and provides a pump system for cleaning fluid.

This objective, as well as other objectives which will become apparent from the discussion that follows, are achieved, according to the present invention, by providing a drain pump at the collecting tank in addition to a circulating pump, whereby the drain pump can be used to actively convey the liquid collected in the collecting tank together with any solids that may be contained therein into the drain line.

The special advantage of the invention is that by providing the drain pump, the liquid can be conveyed actively from the collecting tank, and an operable shut-oil valve in the drain line can be omitted. Only one single hydraulic circuit is formed since the drain pump together with the circulating pump will be associated with the same collecting tank. The liquid can therefore, on one hand, be used for cleaning the cooking space. In this case, the circulating pump conveys the liquid provided in the collecting tank via the circulation line into the cooking space. Preferably, the liquid is delivered against the ventilation fan and is thereby distributed by the ventilation fan. On the other hand, the liquid sitting in the collecting tank can be removed by means of the drain pump and supplied to the drain line. Preferably solids such as lime or other residues are also removed from the collecting tank along with the liquid.

According to a preferred embodiment of the invention, a riser is provided between the collecting tank and the drain line. The drain pump is dimensioned such that the liquid sitting in the collecting tank together with any solids that may be contained therein can be pumped into the drain line via the riser. Providing the riser ensures that the liquid sitting in the collecting tank does not automatically and unintentionally drain via the drain line despite the common hydraulic circuit for drain pump and circulating pump. The riser is designed in particular such that the liquid for the removal of the same from the collecting tank must be pumped beyond a maximum allowable liquid level of the collecting tank. This ensures that emptying of the collecting tank is realized only when the drain pump is operated. Accordingly, a valve in the drain line can be therefore be omitted.

Based on a further development of the invention, a non-return valve is provided in the riser. The non-return valve, which is specifically provided in a lower part of the riser or close to the drain pump, prevents any backflow of liquid that is already in the riser from returning to the collecting tank.

Relative to a horizontal installation position of the cleaning apparatus, the conveyor wheel of the drain pump is preferably provided below the conveyor wheel of the circulating pump. Providing the conveyor wheel of the drain pump below the conveyor wheel of the circulating pump promotes complete or nearly complete emptying of the collecting tank. In addition, any solids that may be present in the liquid will sink to the bottom of the collecting tank and accumulate there. In particular when the liquid in the collecting tank is not circulated. Solids can then be removed by the drain pump which is provided below the circulating pump. In particular, the drain pump can be provided in a horizontal installation position of the collecting tank adjacent to a lower wall of the collecting tank and/or in the vicinity of a sump that defines the lowest point of the collecting tank.

At the same time, the raised arrangement of the circulating pump wheel relative to the drain pump wheel ensures that liquid preferably with no or few solids is conveyed via the circulation line for the purpose of cleaning the cooking space. In this respect, the circulating pump will at most convey small amounts of solids due to its installation location. Thus, the design counteracts an unintended, renewed contamination of the cooking space.

According to a further development of the invention, a first conveyor chamber formed as part of the collecting tank for the conveyor wheel of the drain pump and a second conveyor chamber for the conveyor wheel of the circulating pump are provided. The conveyor chambers each have an inlet opening for the liquid and any solids contained therein and an outlet opening. For example, the riser follows the outlet opening of the first conveyor chamber and the circulation line follows the outlet opening of the second conveyor chamber.

The pumps convey the liquid and the solids that may be contained therein from a suction side where the inlet opening of the conveyor chamber is provided to the pressure side, and an outlet opening is provided in the area of the pressure side. The provision of the conveyor chambers ensures that the pumps can be operated separately and individually under defined ancillary conditions despite the common hydraulic circuit. In particular, suitable positioning of the inlet openings of the conveyor chambers can ensure to a large extent that an exchange of the liquid occurs only via the conveyor chamber that has a driven pump wheel, while the liquid in the other conveyor chamber is essentially not removed or exchanged. In total, this creates defined flow conditions and optimizes the efficiency of the pumps.

The functional separation of the two conveyor circuits in the common hydraulic system is further favored when the inlet opening of the second conveyor chamber is provided above the inlet opening for the first conveyor chamber and in particular at approximately the level of the outlet opening of the first conveyor chamber.

A further development of the invention provides both conveyor chambers below an inlet opening for the supply line that is provided at the collecting tank. By providing the inlet opening of the supply line above the conveyor chambers can ensure that the circulating pump as well as the drain pump can be operated under defined hydraulic conditions by supplying the liquid via the supply line, for example, for the purpose of cleaning the cooking space. The conveyor chamber of the drain pump and the conveyor chamber of the circulating pump can each be flooded completely with liquid.

In particular due to the high temperatures during food preparation and the grease that enters into the collecting tank, temperature-resistant materials such as PPS that can withstand hot grease are used for the collecting tank.

The collecting tank in particular can be designed as several parts, whereby the individual parts are preferably connected by plastic welding. For example, a collection pot and a collar connected to the collection pot can be provided as part of the collecting tank. The drain pump and the circulating pump are flanged to the collection pot, which has a sump and is designed to take up the liquid. The liquid that exits the cooking space and is supplied via the supply line is transported into the collection pot via the collar and the liquid inlet that is located between the collar and the collection pot and is designed as a part of the collection pot. The collar therefore acts as a funnel-like inlet collection element for the collection pot. The conveyor chambers for the conveyor pumps are formed onto the collection pot. The liquid is transported to both pumps via the joint liquid inlet, thus forming a common hydraulic system.

With respect to the drainage and circulation functions, pumps operating according to the flow principle, in particular centrifugal pumps are preferably employed. These pumps are characterized by a good tolerance of foreign materials. However, positive displacement pumps with a good tolerance of foreign materials, for example, travelling wave pumps can be used as well.

According to a further development of the invention, distributed power electronics can be provided to control the drive motor for the ventilation fan as well as to control the motor of the circulating pump and the motor of the drain pump. The power electronics includes in particular a common supply unit with a rectifier, an interim circuit and a power factor correction filter, as well as a plurality of inverted rectifiers for the motors supplied by the supply unit. The motors, which are designed in particular as BLDC motors of brushless DC motors can be operated speed-controlled when providing inverted rectifiers. The inverted rectifiers powered by the common power supply unit can be provided directly at the respective motor and arranged, for example, in the area of a bearing shield of the motor; alternatively, at least individual inverted rectifiers can be realized directly in the area of the common supply unit. In addition, a central control unit can be provided to control the motors and can communicate, for example, via a serial data bus with the inverted rectifiers, and ensure the individual operation of the motors.

Advantageously, cost benefits can be realized by using a common supply unit that is provided decentralized with regard to the motors and the space demand can be reduced. The decentralized accommodation of the power electronics as a whole or of the power supply unit allows for the motors to operate at high ambient temperatures, while the supply units and potentially also the inverted rectifiers are housed and operated spatially separated, preferably in an installation space at a lower ambient temperature. Thus, components with lower temperature resistance and greater cost-effectiveness can be used for this purpose. Also the existing space can be utilized optimally through the separate arrangement of motors, inverted rectifiers and power supply unit, because a plurality of small components is easier to accommodate in the space available in the device than a large unit.

For example, the power electronics as a whole or the supply unit can be provided on a main control board of the kitchen equipment. The main control for the kitchen equipment is provided or installed regularly at a location, where no impermissible high or critical temperatures are present. The functional or spatial integration of the power electronics or of the power supply unit in the main control unit can be beneficial from the construction space and cost perspective and may simplify the installation.

A further development of the invention uses a central control unit that operates in conjunction with the inverted rectifiers of the distributed power electronics. Providing the central control unit ensures that the motors are operated independent of each other and are integrated into a single overall control process. There is also the ability for a modular extension of the system when using the central control unit. For example, more actuator components can be controlled through the already provided control unit. Also, a heater or sensors can work in conjunction with the central control unit or can be operated by it.

In one embodiment of the pump system the distributed power source is associated with a central control unit that interacts with the inverted rectifiers of the distributed power electronics to control the motors.

The drain pump as the first pump and the circulating pump as the second pump are provided at the collection pot in the lower area of the collecting tank. As long as there is liquid in the collecting tank, it will also flow in the collection pot and will permit the operation of the drain pump or of the circulating pump, respectively. Additional areas of the collecting tank could, serve, for example, to take tip liquid that exits from the cooking space of the cooking equipment or that is supplied via the supply line, and then provide it to the collection pot. In particular, the collecting tank can include a collection collar provided above the collection pot. Preferably, a common liquid supply for the two pumps is then provided in the transition between the collection collar and the collection pot.

In the area of the collection pot, the two pumps can be arranged at different levels relative to the horizontal installation position of the pump system. For example, the drain pump can be provided below the circulating pump, for example in the area of the sump that defines the lowest point of the collection pot. The respective arrangement of the pumps ensures on the one hand that the collecting tank and in particular the collection pot can in essence be emptied completely. Also solids that may be present in the liquid will preferably be present in the lower area of the collection pot such that the circulating pump essentially pumps liquid that is free of solids or only has little solid content into the cooking space via the circulation line for the cleaning of said cooking space, while the solids are removed when the drain pump is operated.

The features and details of the cleaning apparatus described in accordance with the invention also apply in connection with the inventive pump system and vice versa. Thus, reciprocal reference can be made to the disclosure relative to the individual aspects of the invention. The drawings serve only as examples to clarify the invention and are not restrictive in nature.

For a full understanding of the present invention, reference should now be made to the following detailed description of the preferred embodiments of the invention as illustrated in the accompanying drawings.

BRIEF DESCRIPTION OF THE DRAWINGS

FIG. 4 is a top view of the pump system according to FIG. 2.

FIG. 5 is a bottom view of the pump system according to FIG. 2.

DETAILED DESCRIPTION OF THE PREFERRED EMBODIMENTS

Figure 1:
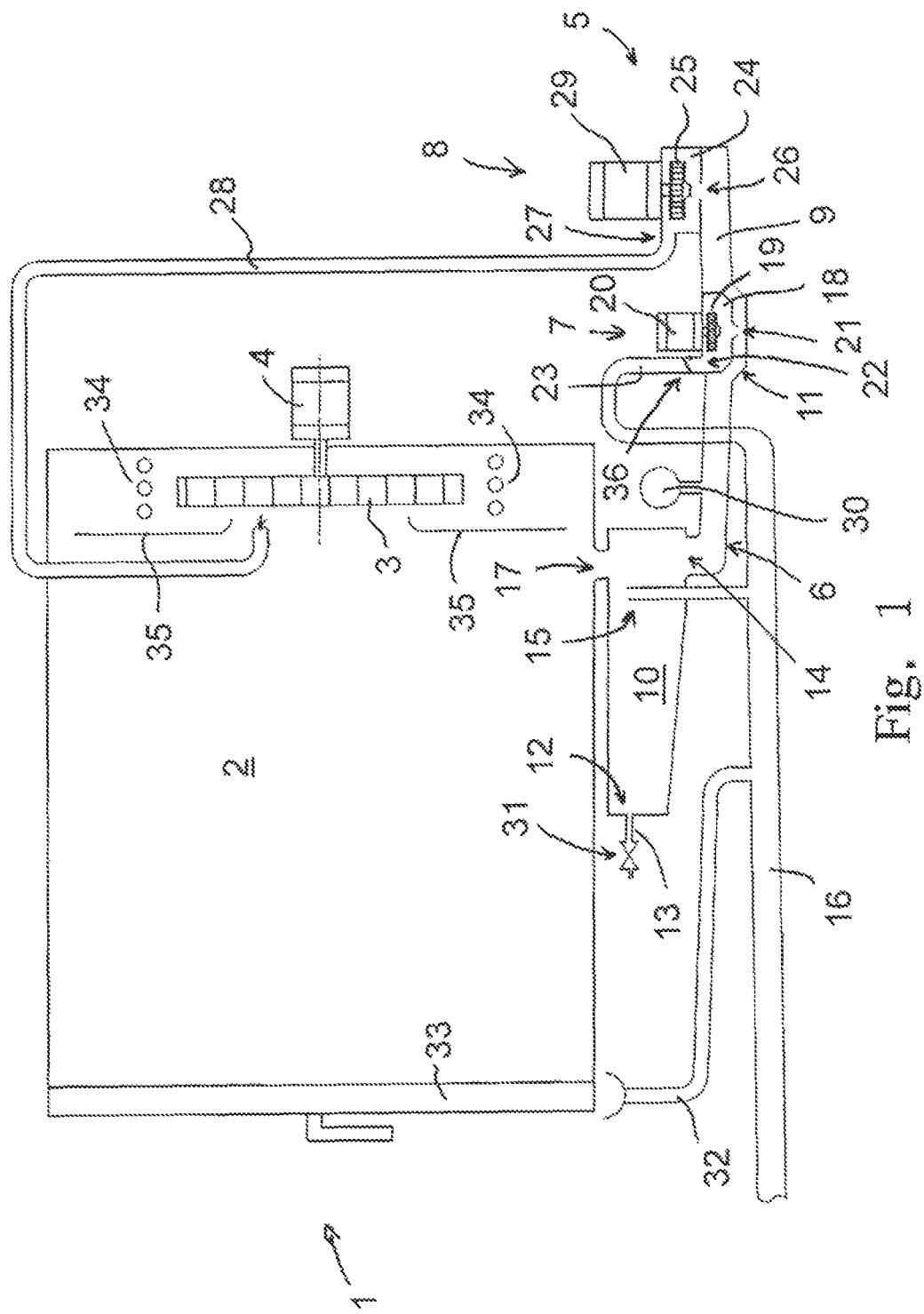
FIG. 1 is a schematic representation of a cleaning apparatus according to the invention having a pump system according to the invention.
Figure 2:
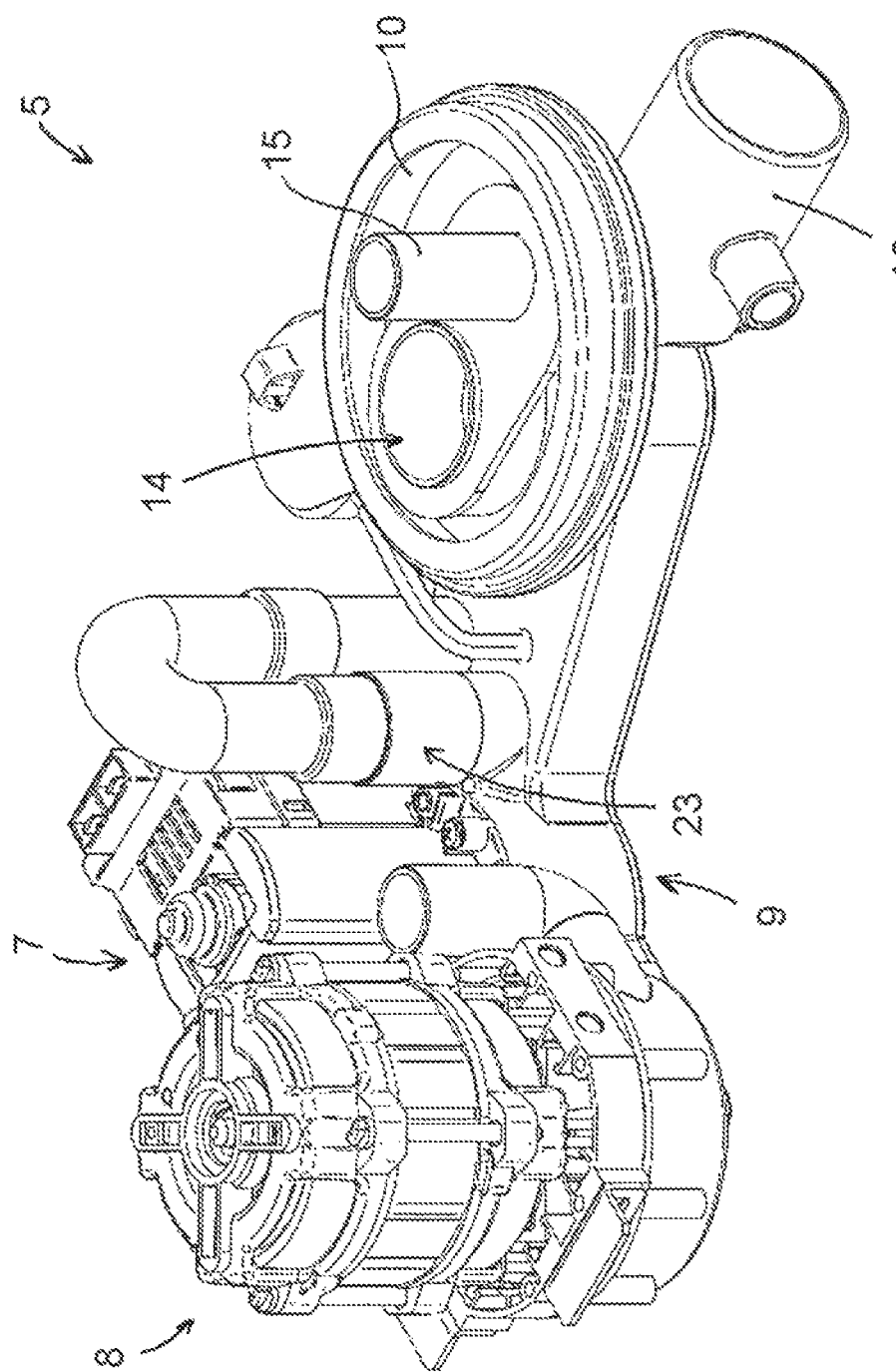
FIG. 2 is a first perspective front view of the pump system according to the invention according to FIG. 1.
Figure 3:
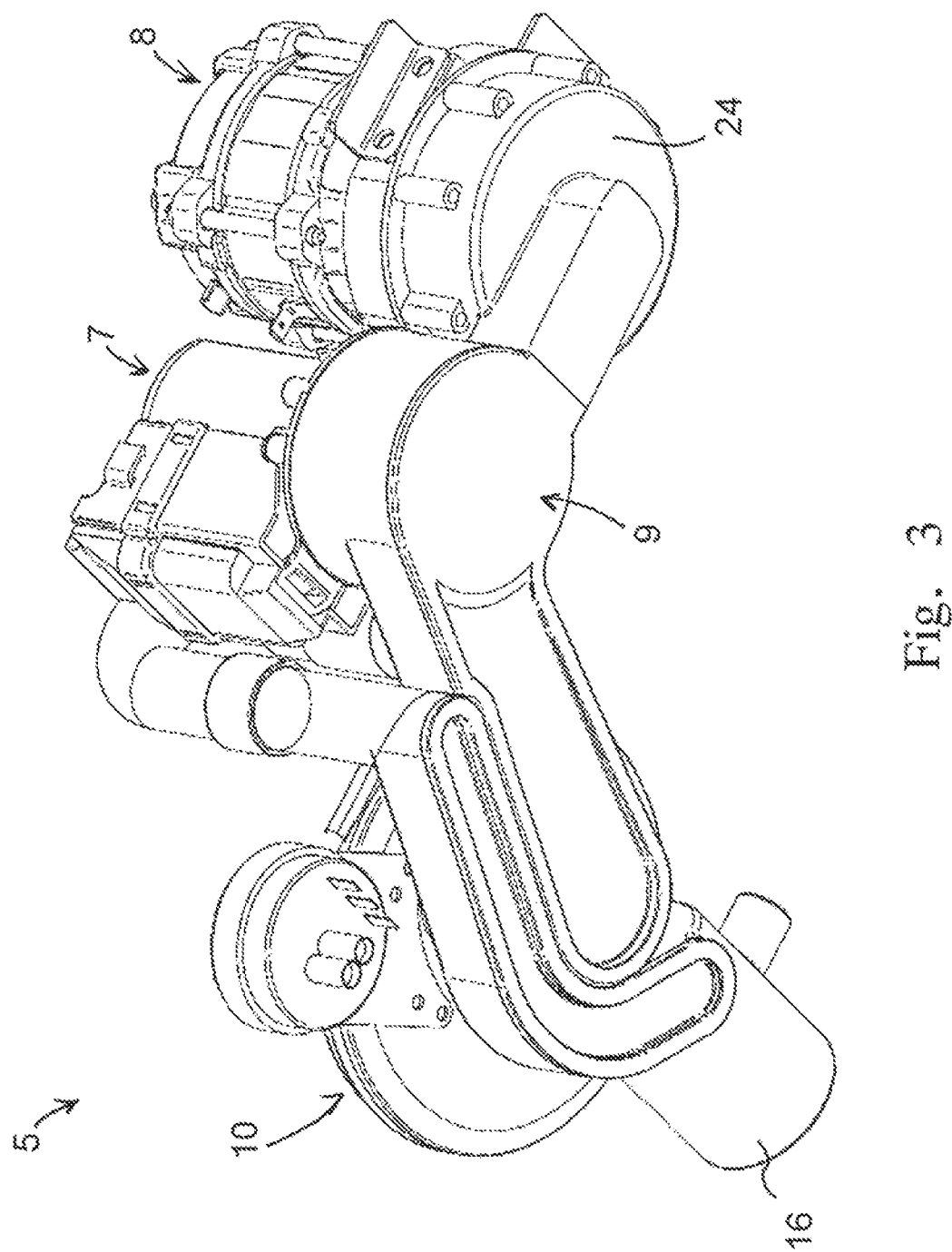
FIG. 3 is a second perspective bottom view of the pump system according to FIG. 2.

The preferred embodiments of the present invention will now be described with reference to FIGS. 1-5 of the drawings. Identical elements in the various figures are designated with the same reference numerals.

FIG. 1 shows a schematic representation of an oven. As essential components, the oven comprises a cooking system 1 having a cooking space 2, a ventilation fan 3, which is provided in the cooking space 2 and a drive motor 4 for the ventilation fan 3, a pump system 5 having a collecting tank 6, a drain pump 7, having a circulating pump 8 and various liquid lines 16, 23, 28 as well as a not shown control. A cleaning apparatus for the cooking equipment is realized consisting of the cooking system 1, the pump system 5 and the control which in particular allows for a self-cleaning function of the cooking space 2. A significant feature of the cleaning apparatus is the common hydraulic circuit formed by the collecting tank 6 and the two pumps 7 and 8 which allow for pumping of the liquid sitting in the collecting tank 6 or in the cooking space 2 either when operating the circulating pump 8 for the purpose of cleaning the cooking space 2 or to pump the liquid out of the collecting tank 6 when operating the drain pump 7.

The pump system 5, which is shown in FIGS. 2-5 in a concrete realization, comprises the multi-part collecting tank 6. A collection pot 9 and a collar 10 are provided here as essential components. Preferably, the collecting tank 6 is made of a temperature-resistant, in particular hot grease resistant and chemically resistant plastic, for example, polyphenylene sulfide (PPS). The individual parts of the multipart collecting tank 6 are preferably tightly interconnected using plastic welding. Collection pot 9 and collar 10 can be made of one part or of a plurality of individual parts.

The drain pump 7 and the circulating pomp 8 are affixed at the collection pot 9, which is provided underneath the collar 10 relative to a horizontal installation position such that that liquid that is in the collection pot 9 is conveyed out of the collection pot 9 using the drain pump 7 or the circulating pump 8, respectively. The circulating pump 8 is mounted above the drain pump 7, relative to the horizontal installation position of the cleaning apparatus. A sump 11 defines a lowest point of the collection pot 9, whereby the drain pump is provided in the area of the sump 11. The arrangement of the drain pump 7 in the area of the sump 11 ensures that liquid sitting in the collection pot 9 is essentially conveyed completely from the collection pot 9. By providing the circulating pump 8 at the collection pot 9 above the drain pump 7 and outside of the sump 11, the circulating pump 8 conveys primarily liquid that is free or mostly free of solids, such as lime or clumped cooking residue. These solids sink to the bottom of the collection pot 9 and are collected in particular in the area of the sump 11, such that they can be removed by the drain pump 7 together with the liquid when emptying the collecting tank 6.

The collar 10 is connected to the collection pot 9. The collection pot 9 has a liquid inlet 14 for this purpose. Provided at the collar 10 is an inlet opening 12 that can be used to flow fresh water, cleaning fluid or the like into the collecting tank 6. A supply line 13 having a valve 31 can be connected to the supply line 12 for this purpose. Furthermore, an overflow 15 is provided in the area of the collar 10. The overflow 15 is connected to a drain line 16 and ensures that liquid drains via the drain line 16 when a maximum liquid level is exceeded in the collecting tank 6. Finally, an outlet opening 17 connects the cooking space 2 with the collar 10 of the collecting tank 6 such that liquid arrives from the cooking space 2 via the outlet opening 17 thereof in the collar 10 of the collecting tank 6 and from there via the liquid inlet 14 in the collection pot 9. The liquid inlet 14 is designed as a common inlet 14 for the drain pump 7 and the circulating pump 8.

A conveyor chamber 18 that is associated with the drain pump 7 is provided at the collection pot 9 as part of the collecting tank 6. A conveyor wheel 19 of the drain pump 7, which is powered by a drain pump motor 20, is located in the conveyor chamber 18. When the drain pump 7 is operated, liquid flows via an inlet opening 21 into the conveyor chamber 18. The liquid continues to flow from the conveyor chamber 18 into a subsequent riser 23 via an outlet opening 22 and from there continues to flow into the drain line 16.

A second conveyor chamber 24 is associated with the circulating pump 8. A conveyor wheel 25 of the circulating pump 8 is provided in the conveyor chamber 24. If the circulating pump 8 is operated, liquid flows out of the collection pot 9 via an inlet opening 26, flows into the conveyor chamber 24 and from there continues to flow into a circulation line 28 via an outlet opening 27. The conveyor wheel 25 of the circulating pump 8 is thereby powered by a circulating pump motor 29. The liquid conveyed by the circulating pump 8 enters the cooking space 2 via the circulation line 28. Preferably, the liquid is applied to the ventilation fan 3, which is powered by the drive motor 4, and is distributed in the cooking space 2.

A non-return valve 36 is provided in the area of the riser 23. The non-return valve 36 is arranged adjacent to the drain pump 7 such that liquid that has already been conveyed into the riser 23 by the drain pump 7 after having passed through the non-return valve 36 is prevented from flowing back in the direction of the collecting tank 6, thus preventing this back flow.

Relative to the horizontal installation position of the cleaning apparatus, the riser 23 is designed such that the liquid that is conveyed by the drain pump is pumped above the maximum liquid level in the collecting tank 6, defined by the overflow 15, and only then arrives in the drain line 16. This prevents an automatic, in particular passive, unintended discharge of the liquid sitting in the collecting tank 6 into the drain line 16. Emptying the collecting tank 6 is therefore always done actively by operating the drain pump 7.

A drain 32 is also associated with the cooking space 2. Liquid, for example condensation that precipitates on a door 33 of the cooking space 2 arrives via the drain 32 directly in the drain line 16.

The control, (not shown) comprises power electronics as well as a control unit. Provided as part of the power electronics are in particular three inverted rectifiers and a common supply unit with a rectifier, an interim circuit and a power factor correction filter (PFC) that are functionally associated with motors 4, 20 and 29. The control unit communicates with the inverted rectifiers of motors 4, 20, 29, via a serial data bus, for example.

A sensor 30, associated with the collection pot 9, is provided at the collecting tank 6. The sensor 30 is preferably designed as a pressure sensor 30 and serves to obtain the liquid amount in the collection pot 9. For example, with respect to the data, the sensor 30 is connected to the control ami of the control in particular via the serial data bus.

Valve 31, which is provided in the supply line 13, can also be controlled from the central control unit. The supply of water or the cleaning fluid, respectively, into the collecting tank 6 is controlled via valve 31.

The control unit can be used, for example, to operate a heater 36 of a cooking device arranged behind an air control surface 35. Another, not shown, control can also be provided for the operation of the cooking device.

The supply of fresh water, cleaning fluid or the like via the supply line 13 into the collecting tank 6 is only exemplary and illustrates a possible embodiment of the cleaning apparatus. For example, the inlet opening 12 can be provided directly at the baking or cooking space 2. For example, fresh water can then be introduced directly into the cooking space 2 via the supply line 13 using valve 31.

A contamination sensor and/or a temperature sensor can be provided as part of the cleaning apparatus. Of course, several sensors can be provided at the collecting tank 6. In this respect providing the pressure sensor 30 is not restrictive. The pressure sensor can be omitted.

As an example, the invention is presented using the example of a cooking device or a cleaning apparatus, respectively, and a pumping system for the cooking equipment. The cleaning apparatus and the pump system can be realized similarly for other kitchen equipment, in particular for combination steamers, baking equipment or similar oven systems. It is used for the preferred automated self-cleaning of such equipment after use. The kitchen equipment can be designed as commercially used kitchen equipment or as household kitchen equipment.

There has thus been shown and described a novel cleaning device for kitchen appliances and pump system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A cleaning apparatus for a kitchen cooking device having a cooking space, which is delimited by at least one wall, and at least one outlet opening for a liquid, said apparatus comprising, in combination:
    a ventilation fan associated with the cooking space and a drive motor for the ventilation fan;
    a collecting tank which at least temporarily collects the liquid that exits the cooking space via the outlet opening;
    a supply line for at least one of fresh water and a cleaning fluid, the supply of fresh water and cleaning fluid being controlled by a valve provided in the supply line;
    a circulating pump at the collecting tank for the liquid sitting in the collecting tank;
    a circulation line by which the liquid sitting in the collecting tank and conveyed by the circulating pump can be transported to the cooking space;
    a drain line for discharging the liquid that exits from the cooking space;
    a drain pump arranged at the collecting tank in addition to the circulating pump, via which the liquid sitting in the collecting tank can be conveyed actively into a discharge line together with solids that may be contained therein;
    a riser arranged between the collecting tank and a drain pipe, wherein the drain pump is dimensioned such that the liquid sitting in the collecting tank and the solids therein are removed via the riser; and
    a non-return valve arranged in the riser that prevents a back flow of the liquid that is located in the riser into the collecting tank,
    wherein a conveyor wheel of the drain pump is provided beneath a conveyor wheel of the circulating pump relative to the horizontal installation position of the cleaning apparatus, and
    further comprising a distributed power source for powering the drive motor for the ventilation fan, a circulating pump motor driving the conveyor wheel of the circulating pump and a drain pump motor for powering driving the conveyor wheel of the drain pump, said distributed power source having a first inverted rectifier for the drive motor of the ventilation fan, a second inverted rectifier for the circulating pump motor and a third inverted rectifier for the drain pump motor, as well as a common supply unit for the first, second and third inverted rectifiers, wherein the common supply unit includes a rectifier and an intermediate circuit.

2. The cleaning apparatus as in claim 1, wherein a first conveyor chamber that houses the conveyor wheel of the drain pump and a second conveyor chamber that houses the conveyor wheel of the circulating pump are provided as an integral part of the collecting tank and wherein an inlet opening and an outlet opening are provided for the liquid at each conveyor chamber.

3. The cleaning apparatus as in claim 2, wherein the riser follows the outlet opening of the first conveyor chamber and the circulation line follows the outlet opening of the second conveyor chamber.

4. The cleaning apparatus as in claim 3, wherein the first conveyor chamber with the conveyor wheel of the drain pump and the second conveyor chamber with the conveyor wheel of the circulating pump are provided below an inlet opening provided at the collecting tank for the supply line and wherein the first conveyor chamber is provided below the second conveyor chamber relative to the horizontal installation position of the cleaning apparatus.

5. The cleaning apparatus as in claim 4, wherein the collecting tank is made of heat-resistant and chemical-resistant plastic; wherein the collecting tank comprises a plurality of components which are connected to one another by plastic welding; wherein a collar and a collection pot are provided as part of the collecting tank and are arranged and configured such that liquid from the cooking space and liquid supplied via the supply line arrives at the collection pot via the collar; and wherein a liquid drain line is located between the collar and the collection pot for removal of liquid via pumps.

6. The cleaning apparatus as in claim 1, wherein one axis of the drain pump and one axis of the circulating pump are oriented vertically in the horizontal installation position of the cleaning apparatus.

7. The cleaning apparatus as in claim 1, further comprising a sensor disposed at the collecting tank for the determination of the amount of liquid in the collecting tank and wherein at least one of a temperature sensor and a contamination sensor are provided for determining a contamination level of the liquid in the collecting tank.

8. The cleaning apparatus as in claim 1, wherein the distributed power source is associated with a central control unit that interacts with the inverted rectifiers of the distributed power source to control the motors.

9. The cleaning apparatus as in claim 8, wherein the central control unit and the inverted rectifier of the distributed power source are connected via a data bus.

10. The cleaning apparatus as in claim 1, wherein the common supply unit further includes a power factor correction filter.

11. A clean apparatus for a kitchen cooking device having a cooking space, which is delimited by at least one wall, and at least one outlet opening for a liquid, said apparatus comprising, in combination:
- a ventilation fan associated with the cooking space and a drive motor for the ventilation fan;
- a collecting tank which at least temporarily collects the liquid that exits the cooking space via the outlet opening;
- a supply line for at least one of fresh water and a cleaning fluid, the supply of fresh water and cleaning fluid being controlled by a valve provided in the supply line;
- a circulating pump at the collecting tank for the liquid sitting in the collecting tank;
- a circulation line by which the liquid sitting in the collectin tank and conveyed by the circulating pump can be transported to the cooking space;
- a drain line for discharging the liquid exits from the cooking space;
- a drain pump arranged at the collecting tank in addition to the circulating pump, via which the liquid sitting in the collecting tank can be conveyed actively into a discharge line together with solids that may be contained therein;
- a riser arranged between the collecting tank and a drain pipe, wherein the drain pump is dimensioned such that the liquid sitting in the collecting tank and the solids therein are removed via the riser; and
- a non-return valve arranged in the riser that prevents a back flow of the liquid that is located in the riser into the collecting tank,
- wherein a conveyor wheel of the drain pump is provided beneath a conveyor wheel of the circulating pump relative to the horizontal installation position of the cleaning apparatus, and further comprising a distributed power source for powering the drive motor for the ventilation fan, a circulating pump motor driving the conveyor wheel of the circulating pump and a drain pump motor for powering driving the conveyor wheel of the drain pump, said distributed power source having a first inverted rectifier for the drive motor of the ventilation fan, a second inverted rectifier for the circulating pump motor and a third inverted rectifier for the drain pump motor, as well as a common supply unit for the first, second and third inverted rectifiers, wherein the common supply unit includes a rectifier and an intermediate circuit, and
- further comprising a pump system for the cleaning apparatus, said pump system comprising, in combination: (1) a first pump configured as a drain pump, (2) a second pump configured as a circulating pump, and (3) a single collection pot for a liquid that can be conveyed by means of the first and second pumps, wherein the collection pot is provided as an integral part of the collecting tank of the cleaning apparatus, wherein the first pump is arranged to empty the collection pot and the second pump is arranged to circulate the liquid provided in the collection pot, and wherein the first and second pumps are flange-mounted to the collection pot.

12. The pump system as in claim 11, further comprising a common liquid feed for the first and second pumps, and wherein the common liquid feed is formed at the collection pot.

* * * * *